Patented Jan. 31, 1928.

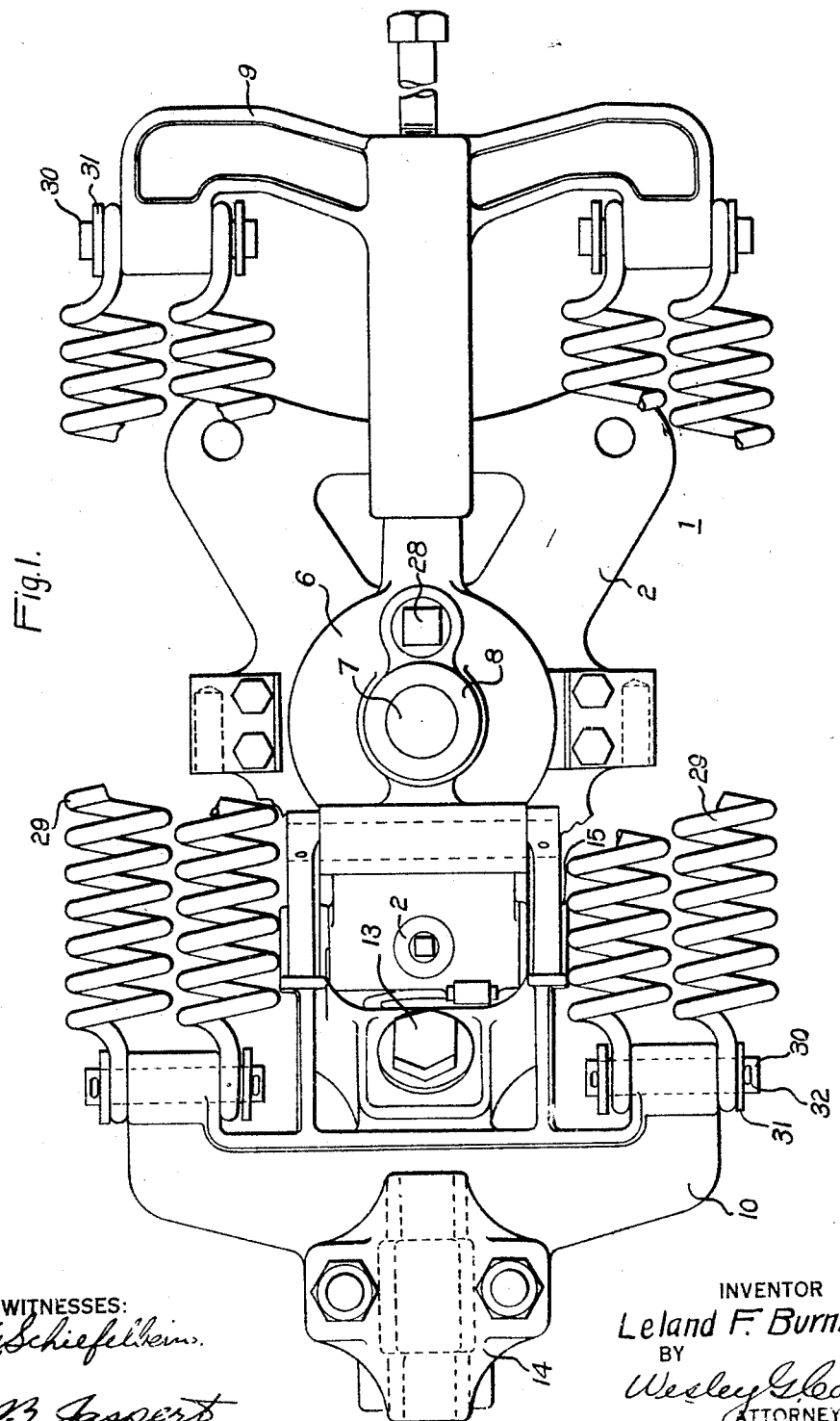

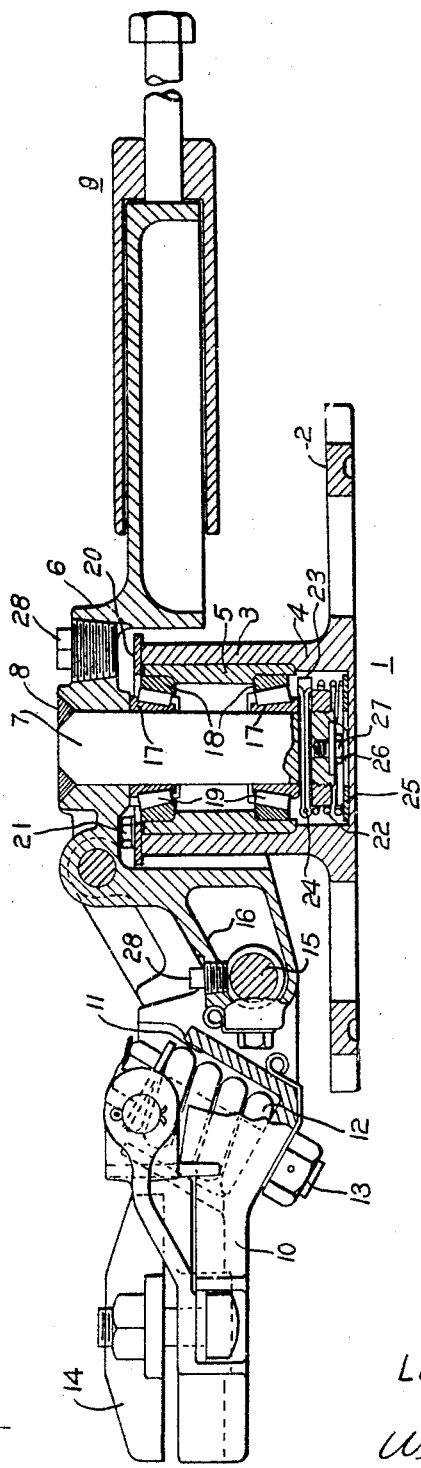

1,657,455

UNITED STATES PATENT OFFICE.

LELAND F. BURNHAM, OF PITTSBURGH, PENNSYLVANIA, ASSIGNOR TO R. D. NUTTAL COMPANY, A CORPORATION OF PENNSYLVANIA.

TROLLEY BASE.

Application filed November 5, 1925. Serial No. 67,022.

My invention relates to trolley bases and more particularly to bases of the roller-bearing type for supporting current-collector members on the roofs of railway vehicles, and the like.

It is among the objects of my invention to provide a trolley base of improved roller type which shall be particularly adapted to distribute the load on the trolley pole, harp and wheel uniformly over the bearing surfaces of the roller members.

Another object of my invention is to provide a trolley base of roller type which shall embody a lubricating chamber for maintaining constant lubrication of the roller bearings and other coacting wearing members.

Another object of my invention is to provide a trolley base of the above-designated character which shall be of simple, compact and durable mechanical construction, which shall be readily accessible for the inspection and replacement of its several cooperating parts, and which shall be readily assembled or dismembered by the placement or removal of a retaining flange that maintains the swivel member and foot of the trolley base in proper operative position.

Various forms of trolley bases embodying anti-friction bearing constructions have been heretofore proposed that utilize roller bearings of such design as to provide a maximum contact with a minimum of friction between the swivelling pole-carrying member and the foot or stationary base upon which it is supported.

I have found that none of these effect an efficient distribution of the cocking or unbalanced overload that is produced by the weight of the trolley pole, harp and wheel, with the result that the bearings are not evenly worn.

My present invention contemplates the utilization of tapered roller bearings in pairs that are arranged in spaced relation to especially provide for the cocking overload in a manner to efficiently and effectively distribute the load over the entire working faces of the roller members. I have also employed a simple design of foot and swivel members that materially decreases the weight of the trolley unit.

In the accompanying drawings, constituting a part hereof and in which like reference characters designate like parts, Fig. 1 is a top plan view of a trolley base, with the service springs partially broken away, embodying the principles of my invention, and Fig. 2 is a view, partially in longitudinal section and partially in elevation, of the device shown in Fig. 1.

Referring to the drawings the trolley base therein illustrated comprises a hollow foot member 1 having a flanged base 2 that is provided with suitable openings for mounting the same upon the roof of a railway vehicle. The foot 1 is provided with a vertically extending cylinder portion 3 having an internal shoulder 4 upon which a retaining ring 5 is seated. A swivel member or cap 6, having a center pin 7 integrally secured thereto, as by a weld 8 formed along the upper perimeter thereof, is mounted on the cylindrical portion 3 of the foot and is adapted for swivelling or rotative movement thereon.

The swivel member 6 is provided on one end with an adjustable spring bracket 9 and on its other end with a pole socket 10. A spring pocket 11 is provided in the pole socket for receiving a coil spring 12 that is held in place by a bolt 13 to constitute a buffer for the pole member, which is adapted to be secured by a clamp 14 on the extended end of the socket member 10. The pole socket 10 is secured to the base of swivel member 6 by a pivot bolt 15, which extends through a grease chamber 16 that is provided in the swivel member 6.

The roller-bearing construction for the swivel member 6 and foot 1 is as follows: A pair of cone races 17 are secured in spaced relation, one above the other, to the central pin 7. The upper race 17 is secured by a press fit and the lower race 17 is loosely fitted on the pin 7 and held in position by a nut screwed on the pin 7. A pair of cup races 18, for cooperating with the races 17 are similarly secured by a pressed fit to the retaining ring 5, which is mounted in the cylinder 3 of the foot 1. A plurality of tapered roller bearings 19 are disposed between each pair of confronting cone and cup races 17 and 18 respectively, and a retaining flange ring 20 is secured to the top end of cylinder portion 3 by cap bolts 21, to maintain the swivel member 6 and foot 1 in their proper operative relation, as hereinafter explained. The center pin 7 is supported on a coil spring 22, which bears against a washer 23 that is secured by a cotter key 24 to the pin member 7.

A contact ring 25 is placed on the bottom of the recess in foot member 1 and a spring clip or shunt 26 is secured at one end to the bottom of pin 7 by a cap screw 27 and is adapted to bear upon the contact ring 25 to electrically connect the swivel member 6 and foot 1 and thus divert the current from the bearings. The swivel member 6 is provided with screw plugs 28 to afford access to the lubricating chamber 16 and to the recess between the center pin 7 and the retaining ring 5, respectively. Grease or heavy oil is supplied to these lubricating chambers to properly lubricate the pivot bearing 15 of the pole bracket 10 and the roller bearings of the swivel member.

Service springs 29 are secured to laterally extending arms of the spring bracket 9 and the pole bracket 10 by pivot hinges 30, which are held in place by washers 31 and cotter keys 32.

The operation of my device is briefly as follows: The trolley pole (not shown) is secured by the clamp 14 of the pole bracket 10, and the service springs 29 are assembled as shown in Fig. 1. The spring members bias the pole bracket 10 towards the center of the swivel member 6, thus tending to raise the pole against the overhead line construction and thereby maintain a suitable pressure of the trolley wheel against the wire. The swivel member 6 and its associated parts, when assembled as shown in Fig. 2, are free to rotate within the foot 1. The swivel member 6 is restrained against cocking movement by the arrangement of the illustrated tapered roller bearings and races of the swivel and foot members. The swivel member 6 is prevented from rising out of the cylinder portion 3 by the flanged ring 20, which extends over the retaining ring 5 in which the cup races 18 are mounted.

The buffer spring 12 functions to yieldingly absorb the shocks incident to the trolley wheel leaving the trolley wire. The pole bracket 10 may be raised or lowered with or against the tension of the service springs 29 to engage the trolley wheel with the overhead line construction.

It is evident from the foregoing description of my invention that trolley bases made in accordance therewith provide simple and efficient supports for current-collecting devices, and that they are of relatively light weight and durable construction, which enhances the life of the base member and materially reduces its cost.

Although I have described a specific embodiment of my invention, it will be obvious to those skilled in the art that various modifications may be made in the details of construction and in the size and proportion of the several cooperating parts without departing from the principles herein set forth.

I claim as my invention:

1. The combination, in a trolley base, of a foot for mounting the base on the roof of a vehicle, a swivel member carried by said foot, a center pin adapted for rotation with said swivel member and extending into said foot, a plurality of cone races mounted on said pin, cup races associated with said foot in cooperative alinement with said cone races, roller bearings disposed between said races, a spring for supporting said pin, and means for holding said swivel member in its operative position.

2. The combination, in a trolley base, of a foot for mounting the base on the roof of a vehicle, a swivel member carried by said foot, a center pin adapted for rotation with said swivel member and extending into said foot, a plurality of cone races mounted on said pin, a retaining ring surrounding a portion of said pin, a plurality of cup races mounted on said ring in cooperative alinement with said cone races, roller bearings disposed between said races, means for retaining said ring on said pin, and means for holding said ring in said foot.

3. The combination, in a trolley base, of a foot for mounting the base on the roof of a vehicle, a swivel member carried by said foot, a center pin adapted for rotation with said swivel member and extending into said foot, a plurality of cone races mounted on said pin, a retaining ring secured in said foot, a plurality of cup races mounted on said ring in cooperative alinement with said cone races, roller bearings disposed between said races, and a flange ring secured to said foot to maintain said swivel member in its operative position.

4. The combination, in a trolley base, of a foot for mounting the base on the roof of a vehicle, a swivel member carried by said foot, a center pin adapted for rotation with said swivel member and extending into said foot, a plurality of cone races mounted on said pin, a retaining ring secured in said foot, a plurality of cup races mounted on said ring in cooperative alinement with said cone races, roller bearings disposed between said races, and a flange ring secured to said foot to maintain said swivel member in its operative position, said foot being provided with a recessed portion constituting a lubricating chamber for said bearings.

5. The combination, in a trolley base, of a foot for mounting the base on the roof of a vehicle, a swivel member carried by said foot, a center pin adapted for rotation with said swivel member and extending into said foot, a plurality of cone races mounted on said pin, a retaining ring secured in said foot, a plurality of cup races mounted on said ring in cooperative alinement with said cone races, roller bearings disposed between said races, means for holding said swivel member in its operative position, a shunt member secured to the bottom of said pin and a contact member secured to said foot to cooperate with said shunt member for shunting current around said bearings.

6. The combination, in a trolley base, of a foot for mounting the base on the roof of a vehicle, a swivel member carried by said foot, a center pin adapted for rotation with said swivel member, and extending into said foot, a plurality of cone races mounted on said pin, a retaining ring secured in said foot, a plurality of cup races mounted on said ring in cooperative alinement with said cone races, roller bearings disposed between said races, means for holding said swivel member in its operative position, a shunt connecting the swivel member and foot, a pole support, spring elements for biasing the trolley pole in a vertical direction, and a buffer comprising a coil spring associated with the swivel member and pole support.

In testimony whereof, I have hereunto subscribed my name this 2nd day of November, 1925.

LELAND F. BURNHAM.